United States Patent
Yamashita et al.

(10) Patent No.: US 9,673,929 B2
(45) Date of Patent: Jun. 6, 2017

(54) OPTICAL TRANSMISSION APPARATUS AND OPTICAL TRANSMISSION SYSTEM

(71) Applicant: FUJITSU LIMITED, Kawasaki-shi, Kanagawa (JP)

(72) Inventors: Makoto Yamashita, Kawasaki (JP); Satoru Okano, Yokohama (JP); Masahiro Yuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 14/810,850

(22) Filed: Jul. 28, 2015

(65) Prior Publication Data
US 2016/0094305 A1    Mar. 31, 2016

(30) Foreign Application Priority Data
Sep. 30, 2014  (JP) ................................. 2014-201026

(51) Int. Cl.
| | |
|---|---|
| *H04B 17/00* | (2015.01) |
| *H04J 14/02* | (2006.01) |
| *H04B 10/079* | (2013.01) |
| *H04B 10/564* | (2013.01) |

(52) U.S. Cl.
CPC .... *H04J 14/0221* (2013.01); *H04B 10/07955* (2013.01); *H04B 10/564* (2013.01)

(58) Field of Classification Search
CPC .... H04J 14/0221; H04J 14/02; H04J 14/0227; H04J 14/0241; H04J 14/0278; H04B 10/572

USPC .......................................................... 398/34
See application file for complete search history.

(56) References Cited

U.S. PATENT DOCUMENTS

| | | | |
|---|---|---|---|
| 2003/0095736 A1* | 5/2003 | Kish, Jr. ................. | B82Y 20/00 385/14 |
| 2005/0063043 A1* | 3/2005 | Nakamoto ......... | H04B 10/2916 359/337 |
| 2007/0092197 A1* | 4/2007 | Mitchell ............. | H04J 14/0227 385/140 |
| 2007/0201878 A1 | 8/2007 | Nakashima et al. | |
| 2013/0170787 A1* | 7/2013 | Nagarajan ............ | H04B 10/506 385/14 |

FOREIGN PATENT DOCUMENTS

| | | |
|---|---|---|
| JP | 2001-333016 | 11/2001 |
| JP | 2007-235412 | 9/2007 |

\* cited by examiner

*Primary Examiner* — Don N Vo
(74) *Attorney, Agent, or Firm* — Staas & Halsey LLP

(57) ABSTRACT

An optical transmission apparatus including: an attenuator that attenuates a power of a first optical signal generated in a first modulation method to a first target level and attenuates a power of a second optical signal generated in a second modulation method, a modulation level in the second modulation method being lower than the modulation level in the first modulation method, to a second target level, the second target level being lower than the first target level; and a transmitter that sends a WDM signal including the first optical signal and the second optical signal that have been attenuated by the attenuator.

14 Claims, 16 Drawing Sheets

FIG. 3

| WAVELENGTH | λ1 | λ2 | λ3 | λ4 | ... |
|---|---|---|---|---|---|
| MODULATION METHOD | QPSK | QPSK | 16QAM | 16QAM | |
| BIT RATE | 100 Gbps | 100 Gbps | 200 Gbps | 200 Gbps | |

FIG. 6

| TRANSMISSION METHOD | | A | B | C | D |
|---|---|---|---|---|---|
| | MODULATION METHOD | BPSK | QPSK | 8PSK | 16QAM |
| | BIT RATE | 50 Gbps | 100 Gbps | 150 Gbps | 200 Gbps |
| TARGET VALUE FOR OUTPUT OF ATTENUATOR | | -21 dBm/ch | -20 dBm/ch | -19 dBm/ch | -18 dBm/ch |
| TARGET VALUE FOR OUTPUT OF ATTENUATOR (RELATIVE VALUE) | | -1 dB | REFERENCE VALUE | +1 dB | +2 dB |
| TARGET VALUE FOR OUTPUT OF TRANSMITTER | | -16 dBm/ch | -15 dBm/ch | -14 dBm/ch | -13 dBm/ch |

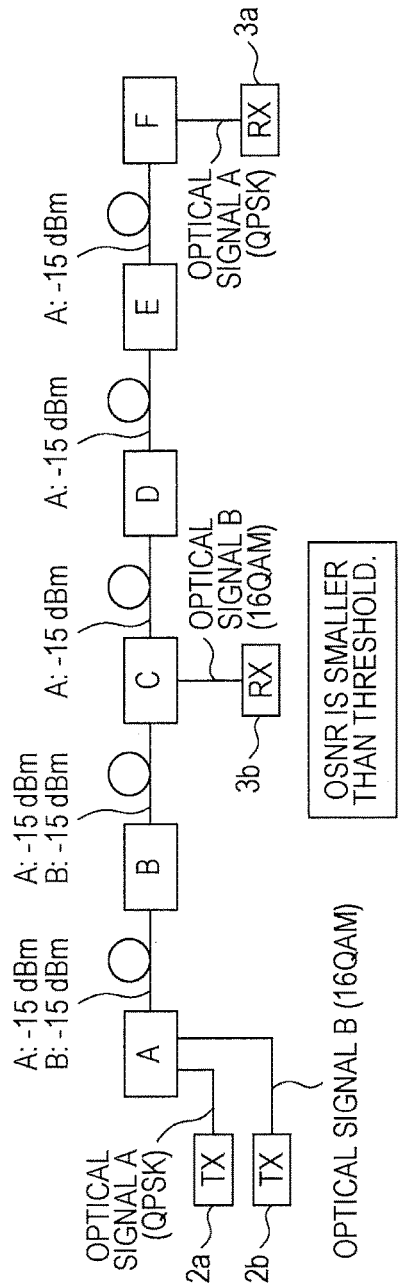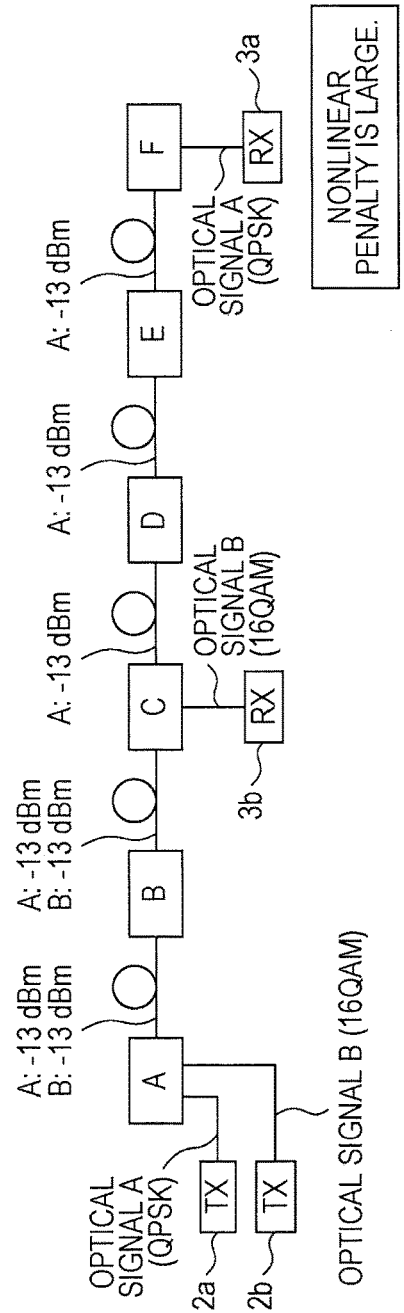

OPTICAL TRANSMISSION APPARATUS AND OPTICAL TRANSMISSION SYSTEM

CROSS-REFERENCE TO RELATED APPLICATION

This application is based upon and claims the benefit of priority of the prior Japanese Patent Application No. 2014-201026, filed on Sep. 30, 2014, the entire contents of which are incorporated herein by reference.

FIELD

The embodiments discussed herein are related to an optical transmission apparatus and an optical transmission system that transmits wavelength division multiplexing (WDM) signals.

BACKGROUND

WDM transmission is practically used as one technology that implements long-distance and large-capacity optical communication. In WDM, a plurality of optical signals with different wavelengths can be transmitted. In recent years, an optical transmission system has been proposed that transmits a WDM signal in which a plurality of optical signals generated in different transmission methods (generated in different modulation methods and/or transmitted at different bit rates) is multiplexed.

Many optical transmission apparatuses that transmit a WDM signal control all optical signals in different wavelength channels in the WDM signal so that the optical signals have the same transmission power. That is, the transmission power of a plurality of optical signals in the WDM signal is equalized. Systems in which optical signals transmitted at different rates or generated in different transmission methods are multiplexed are described in, for example, Japanese Laid-open Patent Publication No. 2001-333016 and Japanese Laid-open Patent Publication No. 2007-235412.

As described above, optical transmission systems are proposed that transmit a WDM signal in which optical signals generated in different transmission methods are multiplexed. However, strength to withstand quality deterioration depends on the transmission method. For example, the withstand strength for an optical signal-to-noise ratio (OSNR) in modulation methods in which many bits are transmitted with one symbol (such as 16-quadrature amplitude modulation (16QAM) and 64QAM) is smaller than in modulation methods in which few bits are transmitted with one symbol (such as binary phase-shift keying (BPSK) and quadrature phase shift keying (QPSK)).

This problem can be solved by, for example, increasing the transmission optical power of the WDM signal to improve the OSNR. When input optical power to an optical transmission path becomes large, however, a penalty caused by a nonlinear optical effect (such as, for example, self-phase modulation or cross-phase modulation) in the optical transmission path also becomes large. Therefore, if transmission power of all optical signals in the WDM signal is increased with the same gain, quality deterioration caused by the nonlinear optical effect (this quality deterioration may be referred to below as the nonlinear penalty) occurs. That is, with the conventional technology, a WDM transmission system in which a plurality of optical signals generated in different modulation methods are included involves a tradeoff between the optical signal-to-noise ratio and the nonlinear penalty.

An object in one aspect of the present disclosure is to suppress, in a WDM transmission system in which a plurality of optical signals generated in different modulation methods are included, quality deterioration in optical signals in these modulation methods.

SUMMARY

According to an aspect of the invention, an optical transmission apparatus comprising: an attenuator that attenuates a power of a first optical signal generated in a first modulation method to a first target level and attenuates a power of a second optical signal generated in a second modulation method, a modulation level in the second modulation method being lower than the modulation level in the first modulation method, to a second target level, the second target level being lower than the first target level; and a transmitter that sends a WDM signal including the first optical signal and the second optical signal that have been attenuated by the attenuator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of transmission method information;

FIG. 6 illustrates an example of a policy to control power of optical signals;

FIGS. 15A and 15B each illustrate an example of transmission in a structure by which the power of optical signals is equalized.

DESCRIPTION OF EMBODIMENTS

Figure 1:
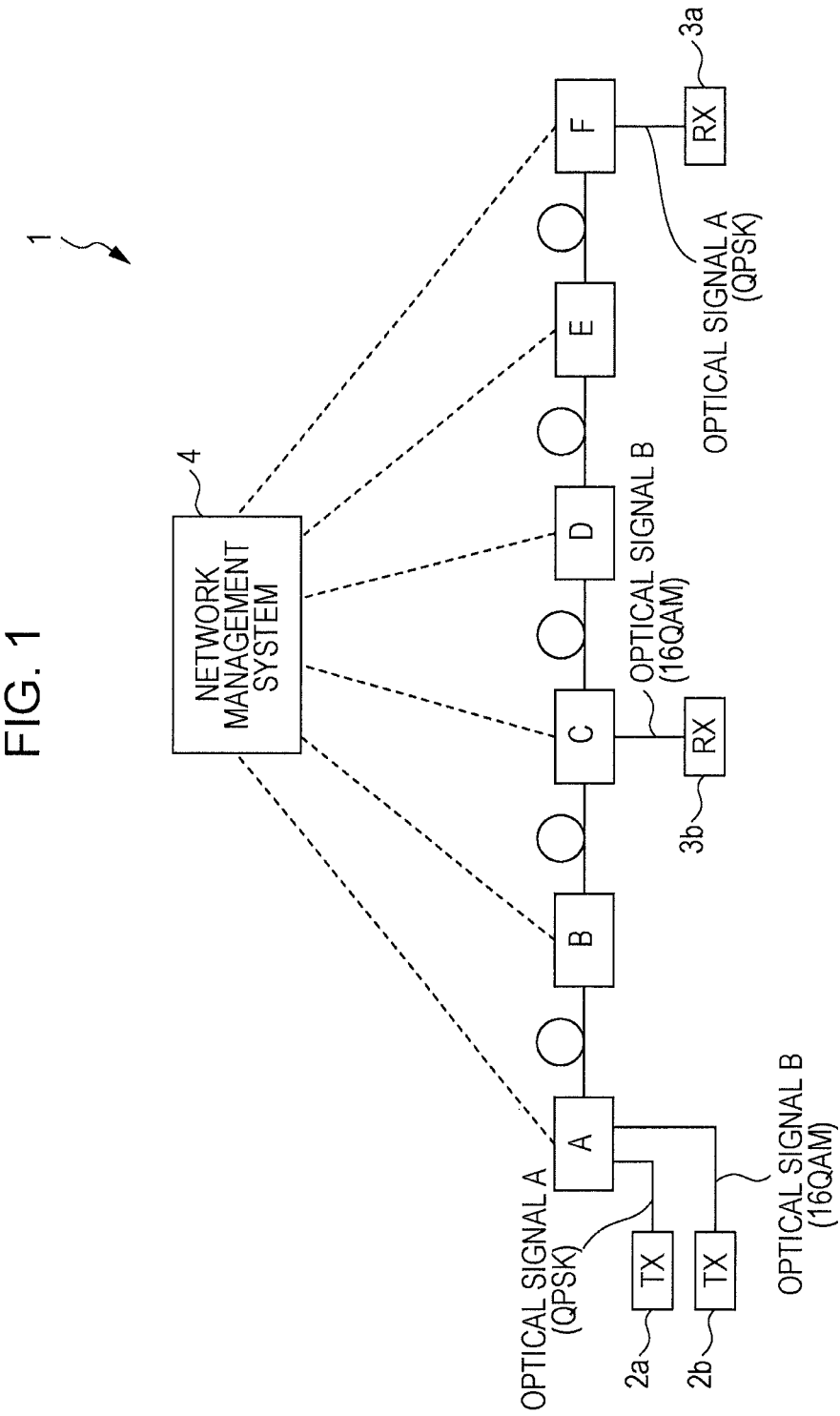
FIG. 1 illustrates an example of an optical transmission system.

FIG. 1 illustrates an example of an optical transmission system in which an optical transmission apparatus according to an embodiment of the present disclosure is used. In the embodiment illustrated in FIG. 1, the optical transmission system 1 includes a plurality of nodes A to F. The plurality of nodes A to F is mutually connected through an optical fiber transmission path.

Each node includes an optical transmission apparatus. In the description below, the optical transmission apparatuses included in the nodes A to F may be respectively referred to as optical transmission apparatuses A to F. The optical transmission apparatus transmits a WDM signal. The optical transmission apparatus is implemented with, for example, a reconfigurable optical add/drop multiplexer (ROADM).

The optical transmission apparatus A includes a transmitter 2a and a transmitter 2b. The optical transmission apparatus F includes a receiver 3a. The optical transmission apparatus C includes a receiver 3b. The transmitter 2a generates an optical signal A. The optical signal A is transmitted to the receiver 3a included in the optical transmission apparatus F. The transmitter 2b generates an optical signal B. The optical signal B is transmitted to the receiver 3b included in the optical transmission apparatus C.

A network management system (NMS) 4 manages the operation of the optical transmission system 1. For example, the network management system 4 sets an inter-node path in response to a request from a client. When setting the inter-node path, the network management system 4 determines a route, a wavelength, a modulation method, and other information about an optical signal and informs the relevant node. A modulation method is determined according to, for example, a data speed and a transmission distance over which the optical signal is transmitted. The transmission distance, in this description, represents the transmission distance from the sending end of the optical signal to its receiving end. The transmission distance from the sending end to the receiving end represents a transmission distance from the transmitter that transmits the optical signal to the receiver that receives the optical signal. In this case, the transmission distance of the optical signal A, for example, represents the transmission distance of a route from the transmitter 2a through the nodes A, B, C, D, E, and F, to the receiver 3a. Alternatively, the transmission distance from the sending end to the receiving end may represent a transmission distance from an optical transmission apparatus that includes a transmitter to an optical transmission apparatus that includes a receiver. In this case, the transmission distance of the optical signal A, for example, represents the transmission distance of a route from the node A through the nodes B, C, D, and E, to node F.

When the transmission distance of an optical signal is long, the quality of the optical signal is deteriorated. For example, a long transmission distance of an optical signal lowers the OSNR of the optical signal at a receiver. However, strength to withstand quality deterioration depends on the transmission method. For example, the withstand strength for the OSNR in modulation methods in which many bits are transmitted with one symbol (such as 16QAM and 64QAM) is smaller than in modulation methods in which few bits are transmitted with one symbol (such as BPSK and QPSK). In the description below, the number of bits transmitted with one symbol may be referred to as the modulation level.

Thus, when the optical path has a long transmission distance, to suppress a bit error, the network management system 4 assigns a modulation method with a low modulation level. In the example in FIG. 1, the optical signal A is an optical signal modulated in QPSK signal. By contrast, when the optical path has a short transmission distance, to increase a transmission capacity, the network management system 4 assigns a modulation method with a high modulation level. In the example in FIG. 1, the optical signal B is an optical signal modulated in 16QAM.

In the optical transmission system 1 having the structure described above, the optical signal A and optical signal B are transmitted by being multiplexed into a WDM signal. The optical transmission apparatus included in each node can extract a desired optical signal from the WDM signal under control of the network management system 4. For example, the optical transmission apparatus C extracts the optical signal B from the WDM signal and sends the optical signal B to the receiver 3b. The optical transmission apparatus included in each node can also insert an optical signal into a WDM signal under control of the network management system 4.

The optical transmission apparatus included in each node adjusts the power of each optical signal multiplexed in a WDM signal. During the power adjustment, the optical transmission apparatus may perform equalization so that a plurality of optical signals in the WDM signal has the same power. If, however, a single certain modulation method is used to perform equalization so that all optical signals have the same power, the quality of optical signals in other modulation methods may be deteriorated.

In the optical transmission system 1 in FIG. 1, it is assumed, for example, that a WDM signal is equalized so that the reception OSNR of a QPSK signal satisfies the OSNR withstand strength in QPSK. The OSNR withstand strength in 16QAM is lower than the OSNR withstand strength in QPSK. Therefore, if QPSK is used in WDM signal equalization, the reception OSNR of a 16QAM signal may fall below the OSNR withstand strength in 16QAM at the receiver 3b.

This problem can be solved by increasing the equalization level of the WDM signal. Specifically, by increasing the transmission power of each optical signal in the WDM signal, the above problem can be solved. In this case, the WDM signal is equalized so that the reception OSNR of the 16QAM signal satisfies the OSNR withstand strength in 16QAM. When the input optical power to an optical fiber transmission path becomes large, however, a penalty caused by a nonlinear optical effect (such as, for example, self-phase modulation effect or cross-phase modulation effect) in the optical fiber transmission path also becomes large. In addition, when the optical signal propagates through the optical fiber transmission path, the nonlinear optical effect is accumulated. Therefore, the longer the transmission distance is, the larger the penalty caused by the nonlinear optical effect is. Therefore, if the equalization level of the WDM signal is raised, the penalty, caused by the nonlinear optical effect, for the QPSK signal may exceed a threshold at the receiver 3a.

When optical signals in different modulation methods have been multiplexed into a WDM signal as described above, if the WDM signal is equalized in a single modulation method at each node, the quality of some optical signals may be deteriorated. In view of this situation, in the optical transmission system 1 according to an embodiment of the present disclosure, the optical transmission apparatus included in each node adjusts the power of each optical signal multiplexed in a WDM signal according to the modulation method of the optical signal.

First Embodiment

Figure 2:
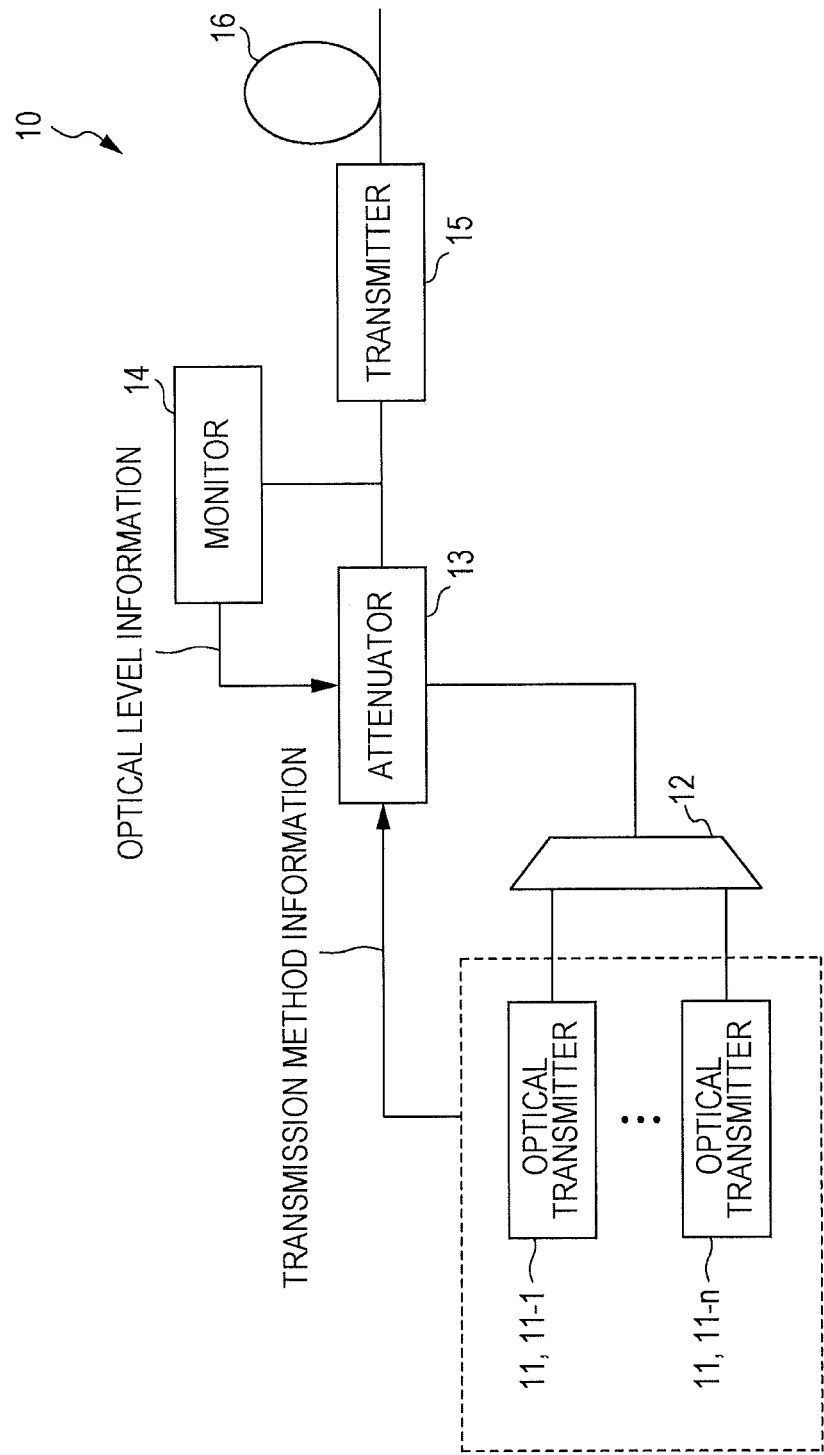
FIG. 2 illustrates the structure of an optical transmission apparatus in a first embodiment.

FIG. 2 illustrates the structure of an optical transmission apparatus in a first embodiment of the present disclosure. An optical transmission apparatus 10 in the first embodiment includes a plurality of optical transmitters 11 (11-1 to 11-n), a combiner 12, an attenuator 13, a monitor 14, and a transmitter 15.

Each of the optical transmitters 11-1 to 11-n generates an optical signal with a different wavelength. In the description below, the optical signals generated by the optical transmitters 11-1 to 11-n may be respectively referred to as the optical signals $\lambda 1$ to $\lambda n$. Each optical transmitter 11, which includes an optical modulator, generates a modulated optical signal according to transmitted data. Each optical transmitter 11 can also generate a modulated optical signal in a specified modulation method. The modulation method is specified by, for example, the network management system 4. The combiner 12 combines the optical signals $\lambda 1$ to $\lambda n$ generated by the optical transmitters 11-1 to 11-n to generate a WDM signal.

The attenuator 13 adjusts the power of the optical signals $\lambda 1$ to $\lambda n$ included in the WDM signal generated by the combiner 12. In the adjustment of the power of the optical signals $\lambda 1$ to $\lambda n$, the attenuator 13 references transmission method information. The transmission method information indicates the modulation method and bit rate of an optical signal transmitted through each wavelength channel, as illustrated in FIG. 3. In the example in FIG. 3, the modulation method and bit rate of the optical signal transmitted through the wavelength channel $\lambda 1$ (that is, optical signal $\lambda 1$) are respectively QPSK and 100 Gbps; the modulation method and bit rate of the optical signal transmitted through the wavelength channel $\lambda 3$ (that is, optical signal $\lambda 3$) are respectively 16QAM and 200 Gbps. A notification of the transmission method information is sent, for example, from the optical transmitter 11 to the attenuator 13, as illustrated in FIG. 2. However, the present disclosure is not limited to this structure. If, for example, the optical transmission apparatus 10 receives transmission method information from the network management system 4, the transmission method information received from the network management system 4 may be given to the attenuator 13.

The monitor 14 monitors the power of the optical signals $\lambda 1$ to $\lambda n$ included in a WDM signal output from the attenuator 13. The monitor 14 notifies the attenuator 13 of optical level information, which indicates monitoring results. Then, the attenuator 13 makes the power of the optical signals $\lambda 1$ to $\lambda n$ approach their respective target levels with reference to results of monitoring by the monitor 14.

The transmitter 15 amplifies the WDM signal output from the attenuator 13 with a pre-specified target gain. In this amplification, the optical signals $\lambda 1$ to $\lambda n$ included in the WDM signal are amplified with the same gain. The WDM signal output from the transmitter 15 is transmitted to a next node through an optical fiber transmission path 16.

Figure 4:
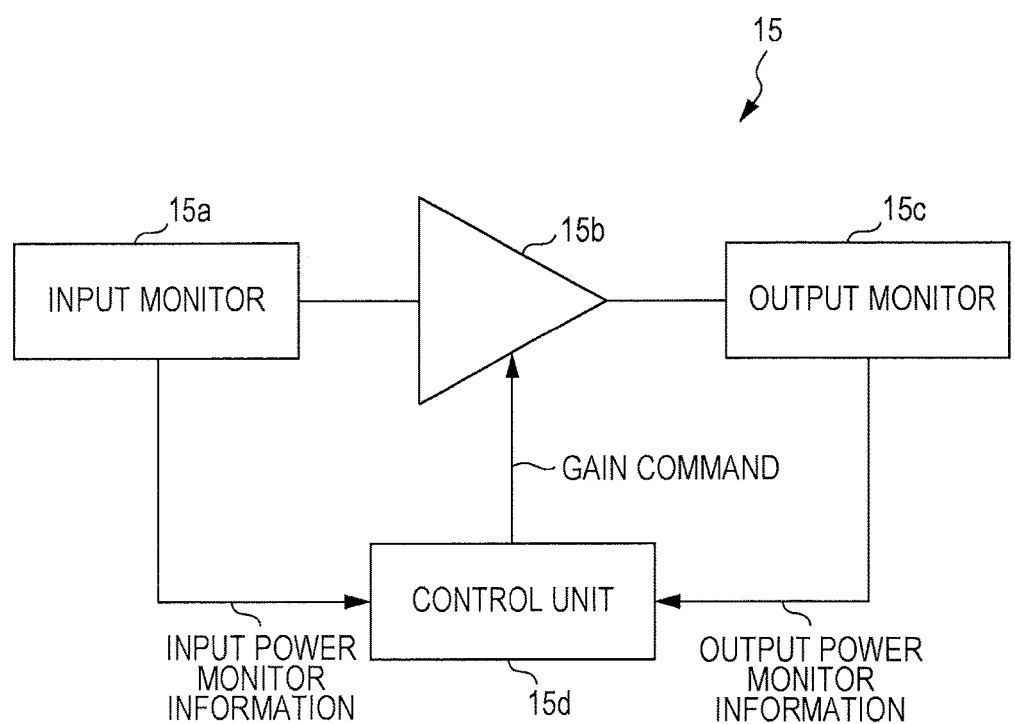
FIG. 4 illustrates an example of a transmitter.

FIG. 4 illustrates an example of the transmitter 15. As illustrated in FIG. 4, the transmitter 15 includes an input monitor 15a, an optical amplifier 15b, an output monitor 15c, and a control unit 15d. The input monitor 15a monitors the total power of a WDM signal. Input power monitor information representing results of monitoring by the input monitor 15a is given to the control unit 15d. The optical amplifier 15b amplifies the WDM signal in response to a gain command given from the control unit 15d. The output monitor 15c monitors the total power of the WDM signal amplified by the optical amplifier 15b. Output power monitor information representing results of monitoring by the output monitor 15c is also given to the control unit 15d. The control unit 15d detects a gain in the optical amplifier 15b according to the input power monitor information and output power monitor information. The control unit 15d then gives a gain command to the optical amplifier 15b so that the detected gain approaches a target gain. Therefore, the transmitter 15 can amplify the WDM signal with the pre-specified target gain.

A WDM signal generated by the optical transmission apparatus 10 structured as described above is sent to a next node. For example, a WDM signal generated by the optical transmission apparatus 10 included in the node A is sent to the node B. Although, in the embodiment illustrated in FIG. 2, optical transmitters 11 are included in the optical transmission apparatus 10, these optical transmitters 11 may be disposed outside the optical transmission apparatus 10.

Figure 5:
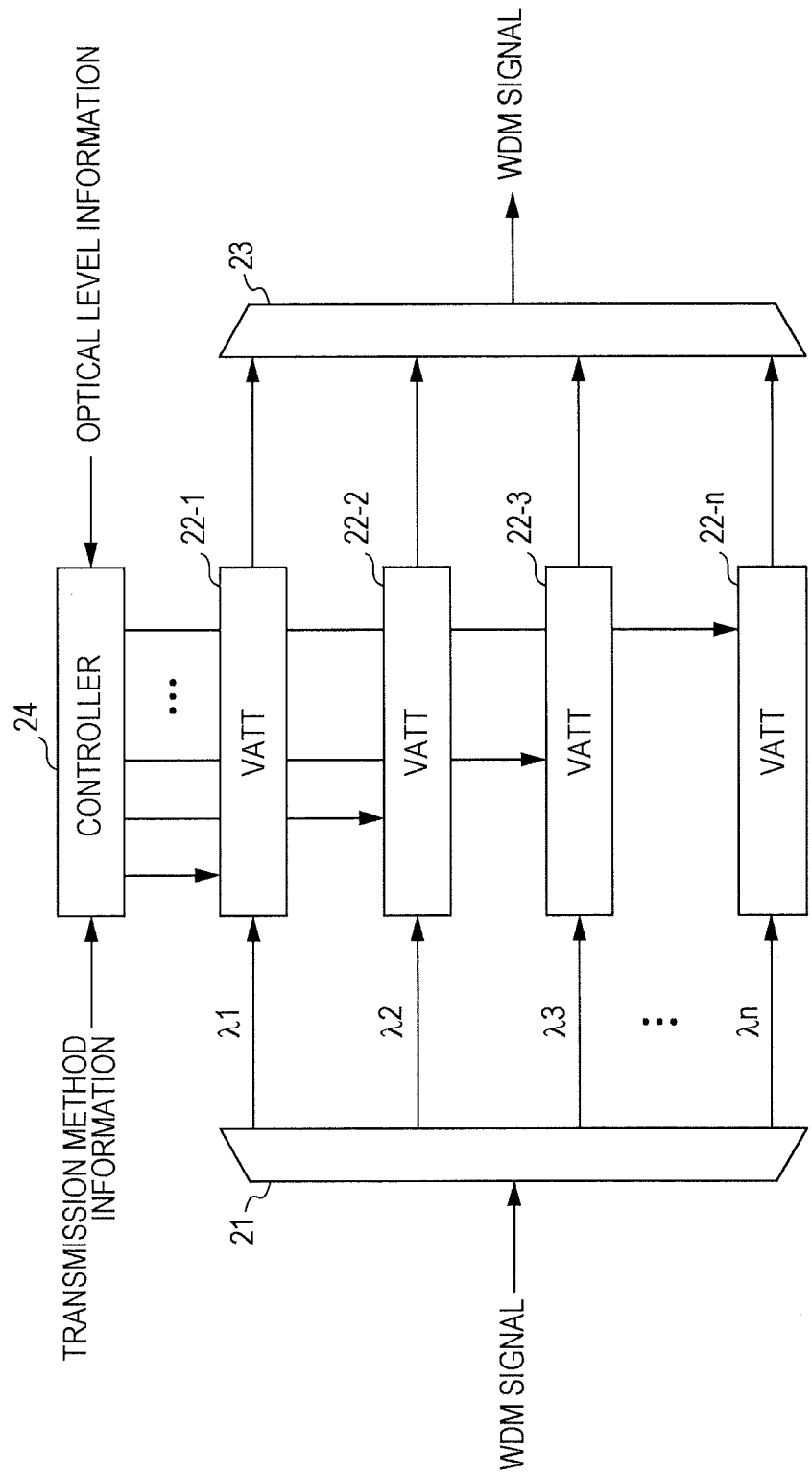
FIG. 5 illustrates an example of an attenuator.

FIG. 5 illustrates an example of the attenuator 13. The attenuator 13 includes a demultiplexer 21, a plurality of variable attenuators (VATTs) 22-1 to 22-n, a multiplexer 23, and a controller 24. The demultiplexer 21 splits an input WDM signal for each wavelength. Optical signals $\lambda 1$ to $\lambda n$ generated by the demultiplexer 21 are respectively sent to the variable attenuators 22-1 to 22-n. The variable attenuators 22-1 to 22-n respectively attenuate the optical signals $\lambda 1$ to $\lambda n$ in response to attenuation commands sent from the controller 24. The multiplexer 23 combines the optical signals $\lambda 1$ to $\lambda n$ attenuated by the variable attenuators 22-1 to 22-n to generate an output WDM signal. The controller 24 controls the variable attenuators 22-1 to 22-n according to the transmission method information. For example, the controller 24 generates attenuation commands that command amounts of attenuation in the variable attenuators 22-1 to 22-n. In the creation of the attenuation commands, the controller 24 references the optical level information given from the monitor 14.

The controller 24 may be implemented by, for example, a preprocessor system that includes a processor and a memory. Alternatively, the controller 24 may be implemented by a hardware circuit or by a combination of software and a hardware circuit.

The attenuator 13 controls the power of each optical signal according to a predetermined policy. In this embodiment, the attenuator 13 controls the power of each optical signal according to the policy illustrated in FIG. 6. The power control policy represents target values for output power in each transmission method.

In a transmission method A (BPSK, 50 Gbps), for example, −16 dBm/ch is specified as the target value for the output power of the transmitter 15. In this embodiment, the gain of the transmitter 15 is assumed to be 5 dB/ch. In the transmission method A (BPSK, 50 Gbps), therefore, −21 dBm/ch is specified as the target value for the output power of the attenuator 13. A target value for the output power of the transmitter 15 and a target value for the output power of the attenuator 13 are also specified in a transmission method B (QPSK, 100 Gbps), a transmission method C (8PSK, 150 Gbps), and a transmission method D (16QAM, 200 Gbps).

Although, in the embodiment illustrated in FIG. 6, target power is specified for the above four transmission methods, a policy may be specified for other transmission methods. For example, a policy may be specified for 64QAM, 256QAM, and the like. Alternatively, a policy may be specified for polarized multiplexed optical signals. Although, in the embodiment illustrated in FIG. 6, the modulation methods and bit rates are uniquely associated with each other, the modulation methods and bit rates may not be uniquely associated with each other. For example, both an optical signal transmitted at 100 Gbps in QPSK and an optical signal transmitted at 50 Gbps in QPSK may be present.

As described above, target values for output power (including a target value for the output power of the transmitter 15 and a target value for the output power of the attenuator 13) of each optical signal are specified in each modulation method. Specifically, the lower the modulation level in the modulation method is, the lower the target value for output power is; the higher the modulation level in the modulation method is, the higher the target value for output power is. That is, a target value for output power in a modulation method with a high modulation level is higher than in a modulation method with a low modulation level. In other words, a target value for output power in a modulation method with a low modulation level is lower than in a modulation method with a high modulation level. When compared with, for example, QPSK, the target value for output power in BPSK is 1 dB lower, the target value for output power in 8PSK is 1 dB higher, and the target value for output power in 16QAM is 2 dB higher.

Figure 7:
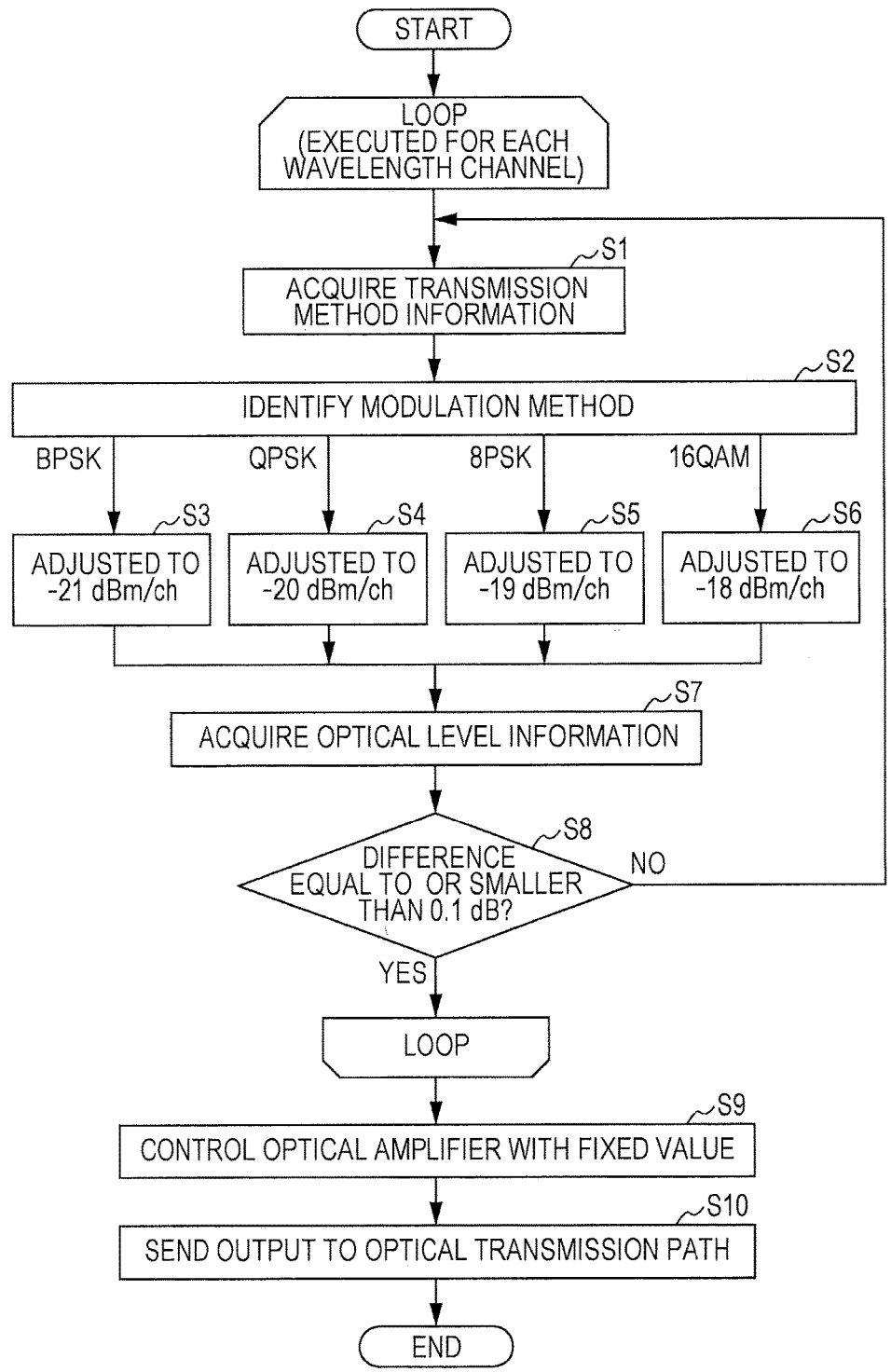
FIG. 7 is a flowchart illustrating processing to control power of optical signals.

FIG. 7 is a flowchart illustrating processing to control power of optical signals. Processing in this flowchart is executed when, for example, an optical transmission apparatus starts communication. Processing in this flowchart is also executed when an optical path is added or modified in the optical transmission system 1. Alternatively, the optical transmission apparatus may execute processing in the flowchart in FIG. 7 in response to a command sent from a network manager or the network management system 4.

The controller 24 in the attenuator 13 executes processing in S1 to S8 in each wavelength channel in a WDM signal. That is, processing in S1 to S8 is executed for the wavelengths λ1 to λn.

In S1, the controller 24 acquires transmission method information. The transmission method information represents a modulation method and bit rate for each wavelength channel, as illustrated in FIG. 3. In this embodiment, however, the controller 24 controls the amount of attenuation according to the modulation method indicated in the transmission method information.

In S2, the controller 24 references the acquired transmission method information and identifies a modulation method corresponding to a wavelength channel eligible for processing. In this embodiment, it is determined which of BPSK, QPSK, 8PSK, and 16QAM is the modulation method corresponding to the wavelength channel.

If the modulation method is BPSK, the controller 24 calculates, in S3, the amount of attenuation in the relevant variable attenuator so that the power of the optical signal output from the attenuator 13 approaches the target value specified for BPSK. As described above with reference to FIG. 6, −21 dBm/ch is specified for BPSK as the target value for the output level of the attenuator 13. Therefore, the controller 24 calculates the amount of attenuation in the relevant variable attenuator so that the power of the optical signal output from the attenuator 13 approaches −21 dBm.

If the modulation method is QPSK, the controller 24 calculates, in S4, the amount of attenuation in the relevant variable attenuator so that the power of the optical signal output from the attenuator 13 approaches the target value (−20 dBm/ch) specified for QPSK. If the modulation method is 8PSK, the controller 24 calculates, in S5, the amount of attenuation in the relevant variable attenuator so that the power of the optical signal output from the attenuator 13 approaches the target value (−19 dBm/ch) specified for 8PSK. If the modulation method is 16QAM, the controller 24 calculates, in S6, the amount of attenuation in the relevant variable attenuator so that the power of the optical signal output from the attenuator 13 approaches the target value (−18 dBm/ch) specified for 16QAM.

The controller 24 gives an attenuation command that represents the amount of attenuation calculated in any one of S3 to S6 to the relevant variable attenuator. The variable attenuator controls the amount of attenuation in response to the attenuation command. Therefore, the power of the optical signal output from the attenuator 13 approaches the target value corresponding to the modulation method.

After having controlled the power of the optical signal as described above, the controller 24 acquires optical level information from the monitor 14 in S7. The controller 24 then detects a difference between the target value and the optical power monitored by the monitor 14. If the difference is larger than a predetermined threshold (0.1 dB, for example), the processing performed by the controller 24 returns to S1. When processing in S1 to S8 is repeatedly executed, the power of the optical signal output from the attenuator 13 is adjusted to the target value corresponding to the modulation method.

If the difference is equal to or smaller than the threshold in S8, the controller 24 selects a next wavelength channel and executes the processing in S1 to S8. That is, the optical power of the next wavelength channel is adjusted. After optical power adjustment by the attenuator 13 has been completed for all wavelength channels, the processing performed by the controller 24 proceeds to S9.

In S9, the control unit 15*d* in the transmitter 15 controls a gain in the optical amplifier 15*b*. Specifically, as described above with reference to FIG. 4, the control unit 15*d* controls the optical amplifier 15*b* so that the WDM signal is amplified with the pre-specified target gain. In S10, the transmitter 15 outputs the WDM signal amplified by the optical amplifier 15*b* to the optical fiber transmission path 16.

If the optical power of the wavelength channel illustrated in FIG. 3, for example, is controlled, the controller 24 references the transmission method information and identifies that the modulation method for the optical signal is QPSK. In S4, the controller 24 then controls the variable attenuator 22-1 to adjust the power of the optical signal λ1 output from the attenuator 13 to −20 dBm. Specifically, the controller 24 controls the amount of attenuation in the variable attenuator 22-1 so that the power, detected by the monitor 14, of the optical signal λ1 is adjusted to −20 dBm.

If the optical power of the wavelength channel λ3 illustrated in FIG. 3, for example, is controlled, the controller 24 references the transmission method information and identifies that the modulation method for the optical signal is 16QAM. In S6, the controller 24 then controls the variable attenuator 22-3 to adjust the power of the optical signal λ3 output from the attenuator 13 to −18 dBm. Specifically, the controller 24 controls the amount of attenuation in the variable attenuator 22-3 so that the power, detected by the monitor 14, of the optical signal λ3 is adjusted to −18 dBm.

In this embodiment, the target gain in the optical amplifier 15*b* is set with respect to an optical signal generated in a modulation method with a low modulation level (such as, for example, QPSK). In this case, the target gain is set so that the OSNR of a QPSK modulated optical signal in a next node satisfies the OSNR withstand strength in QPSK. The transmission power of a 16QAM modulated optical signal is set so as to be higher than the transmission power of a QPSK modulated. Therefore, the OSNR of the 16QAM modulated optical signal in the next node has a margin with respect to the OSNR withstand strength in QPSK. That is, the OSNR of the 16QAM modulated optical signal in the next node can satisfy the OSNR of the 16QAM modulated optical signal, which is stricter than the OSNR in QPSK. In other words, the attenuator 13 controls transmission power for each modulation method so that the OSNR of the QPSK modulated optical signal satisfies the OSNR in QPSK and the OSNR of the 16QAM modulated optical signal satisfies the OSNR in 16QAM.

As described above, in the first embodiment, the transmission power of an optical signal in a modulation method with a low modulation level (such as, for example, QPSK) is adjusted to a value lower than the transmission power of an optical signal in a modulation method with a high modulation level (such as, for example, 16QAM). In other words, the transmission power of an optical signal in a modulation method with a high modulation level is adjusted to a value higher than the transmission power of an optical signal in a modulation method with a low modulation level. When the transmission power of each optical signal in a WDM signal is controlled in this way, the following effects are obtained.

A withstand strength against to the OSNR in a modulation method with a low modulation level is higher than in a modulation method with a high modulation level. Therefore, an optical signal generated in a modulation method with a low modulation level is more likely to be used in an optical path with a long transmission distance than in a modulation method with a high modulation level. When a distance over which an optical signal is transmitted is long, however, a penalty caused by a nonlinear optical effect in the optical fiber transmission path becomes large. When the input optical power to the optical transmission path is reduced, the penalty caused by the nonlinear optical effect in the optical fiber transmission path is suppressed. Therefore, the optical transmission apparatus 10 makes the transmission power of an optical signal generated in a modulation method with a low modulation level lower than in a modulation method with a high modulation level. Therefore, for an optical signal generated in a modulation method with a low modulation level, it is possible to suppress the penalty caused by the nonlinear optical effect in the optical fiber transmission path, within the range of the withstand strength against to the OSNR.

A withstand strength against to the OSNR in a modulation method with a high modulation level is lower than in a modulation method with a low modulation level. Therefore, an optical signal generated in a modulation method with a high modulation level is more likely to be used in an optical path with a short transmission distance than in a modulation method with a low modulation level. When the transmission distance is short, the penalty caused by the nonlinear optical effect in the optical fiber transmission path is small. That is, as for an optical signal generated in a modulation method with a high modulation level, the penalty caused by the nonlinear optical effect in the optical fiber transmission path has a margin for an upper limit, so it is possible to increase transmission power. Therefore, the optical transmission apparatus 10 makes the transmission power of an optical signal generated in a modulation method with a high modulation level higher than in a modulation method with a low modulation level. Therefore, for an optical signal generated in a modulation method with a high modulation level, it is possible to improve the OSNR in a state in which the penalty caused by the nonlinear optical effect in the optical fiber transmission path is suppressed.

As described above, when an optical signal is transmitted over a short distance, the nonlinear penalty is small, so it is preferable to increase the transmission power to improve the OSNR instead of suppressing the nonlinear effect. Therefore, for an optical signal that is highly likely to be transmitted through a path with a short transmission distance (that is, an optical signal generated in a modulation method with a high modulation level), the amount of attenuation is reduced to increase the transmission power. By contrast, for an optical signal that is transmitted over a long transmission distance, the nonlinear penalty is large, so it is preferable to suppress the transmission power to suppress the nonlinear effect. Therefore, for an optical signal that is highly likely to be transmitted through a path with a long transmission distance (that is, an optical signal generated in a modulation method with a low modulation level), the amount of attenuation is increased to lower the transmission power.

If the power of all optical signals in a WDM signal is uniformly equalized, the following problems arise.

(1) When a WDM signal is equalized with respect to a modulation method with a low modulation level, the OSNR of an optical signal generated in a modulation method with a high modulation level may not satisfy a demanded level.

(2) When a WDM signal is equalized with respect to a modulation method with a high modulation level, a nonlinear penalty for an optical signal generated in a modulation method with a low modulation level may not satisfy a demanded level. With the structure in the embodiment of the present disclosure, however, these problems can be avoided.

In the embodiment of the present disclosure, a target value for the transmission power of an optical signal in each modulation method is determined according to the following policies.

(1) A penalty caused by a nonlinear optical effect in an optical fiber transmission path from a sending end of the optical signal to its receiving end is smaller than a predetermined threshold.

(2) The OSNR at the receiving end of the optical signal is within the range of the OSNR withstand strength corresponding to the modulation method. Target values that satisfy these policies are determined according to simulation results, actually measured values, or the like.

Second Embodiment

Figure 8:
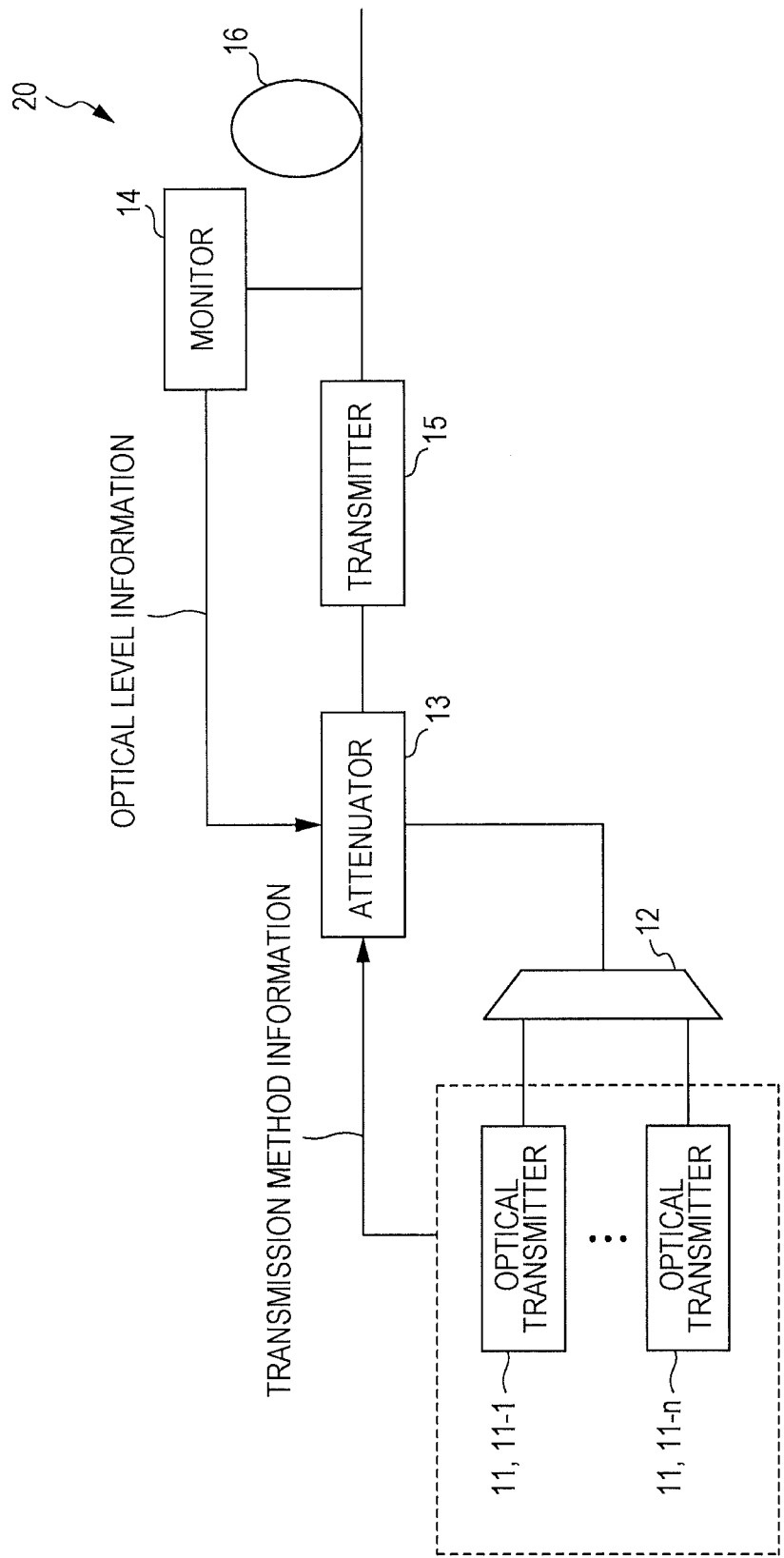
FIG. 8 illustrates the structure of an optical transmission apparatus in a second embodiment.

FIG. 8 illustrates the structure of an optical transmission apparatus in a second embodiment of the present disclosure. An optical transmission apparatus 20 in the second embodiment includes the plurality of optical transmitters 11 (11-1 to 11-*n*), the combiner 12, the attenuator 13, the monitor 14, and the transmitter 15, as in the first embodiment. However, the monitor 14 monitors the power of the optical signals λ1 to λn included in a WDM signal output from the transmitter 15.

The structure and operation of the attenuator 13 in the second embodiment are almost the same as in the first embodiment. In the second embodiment, however, the power of each optical signal included in a WDM signal output from the transmitter 15 is controlled to a target level; in the first embodiment, the power of each optical signal included in a WDM signal output from the attenuator 13 has been controlled to a target level. Therefore, when the processing in the flowchart in FIG. 7 is executed in the second embodiment, the target values in S3 to S6 differ from the first embodiment. Specifically, in the second embodiment, the transmission power of a BPSK modulated optical signal is controlled to −16 dBm, the transmission power of a QPSK modulated optical signal is controlled to −15 dBm, the transmission power of an 8PSK modulated optical signal is controlled to −14 dBm, and the transmission power of a 16QAM modulated optical signal is controlled to −13 dBm, as illustrated in FIG. 6.

Third Embodiment

Figure 9:
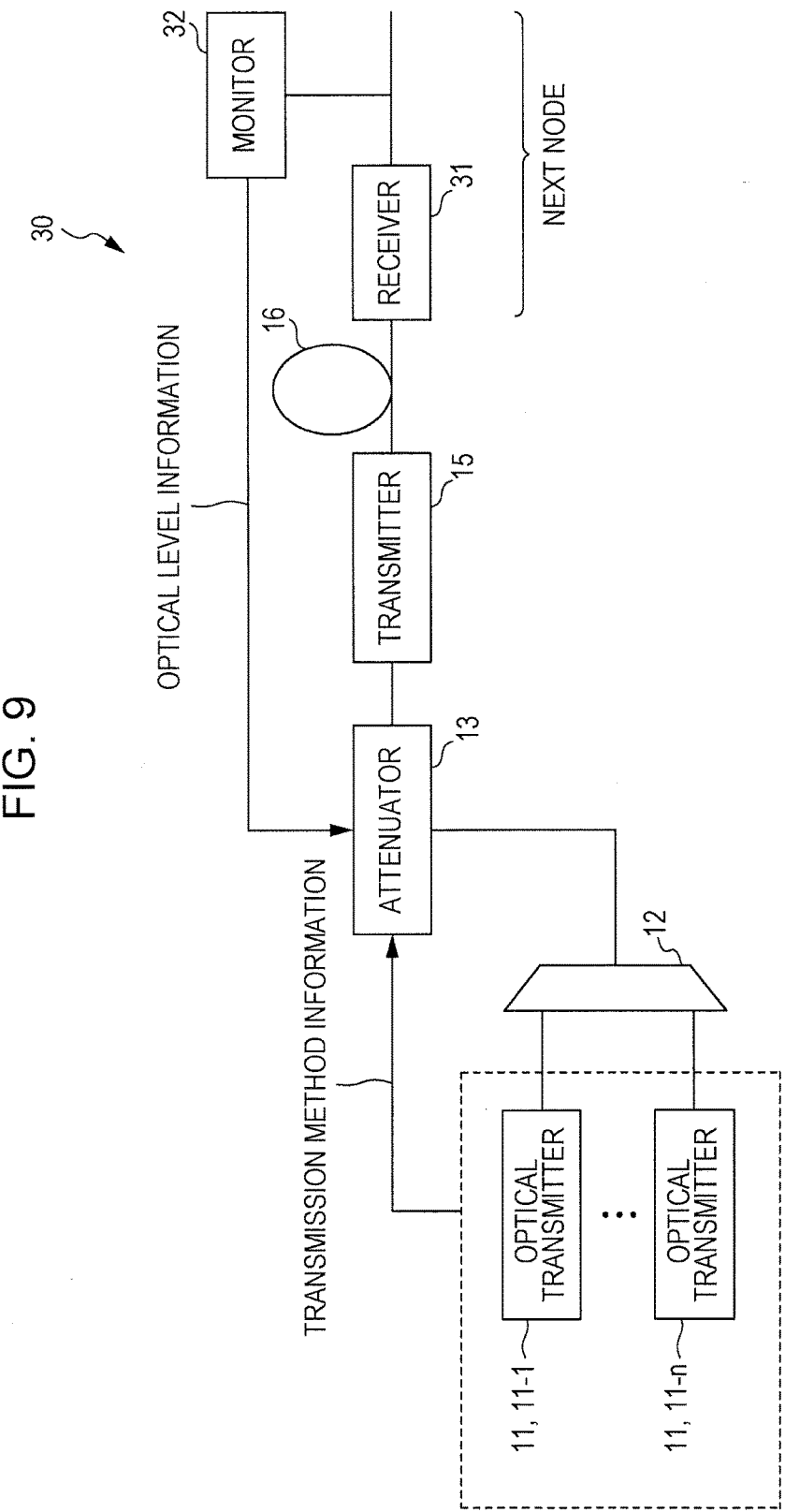
FIG. 9 illustrates the structure of an optical transmission apparatus in a third embodiment.

FIG. 9 illustrates the structure of an optical transmission apparatus in a third embodiment of the present disclosure. As illustrated in FIG. 9, an optical transmission apparatus 30 in the third embodiment controls the transmission power of each optical signal in a WDM signal according to optical level information received from a next node. That is, a WDM signal sent from one optical transmission apparatus 30 is transmitted through the optical fiber transmission path 16 and is received by a receiver 31 in the optical transmission apparatus in a next node. The receiver 31 may include an optical amplifier that amplifies all received WDM signals with a single predetermined gain. A monitor 32 included in the optical transmission apparatus 30 monitors the power of each optical signal in the WDM signal output from the receiver 31. The monitor 32 sends a notification of optical level information that represents monitoring results to the optical transmission apparatus 30 from which the WDM signal has been sent. In this case, the monitor 32 can send the optical level information to that optical transmission apparatus 30 through the optical fiber transmission path 16. However, the monitor 32 may use another method to send the optical level information to that optical transmission apparatus 30. For example, the monitor 32 may notify that optical transmission apparatus 30 of the optical level information through the network management system 4.

When the processing in the flowchart in FIG. 7 is executed in the third embodiment, the target values in S3 to S6 differ from the first and second embodiments. Target values in the third embodiment are determined by using a target value for the output level of the transmitter 15 as a base, in consideration of a loss in the optical fiber transmission path 16 and a gain in the receiver 31 in a next node.

Fourth Embodiment

Figure 10:
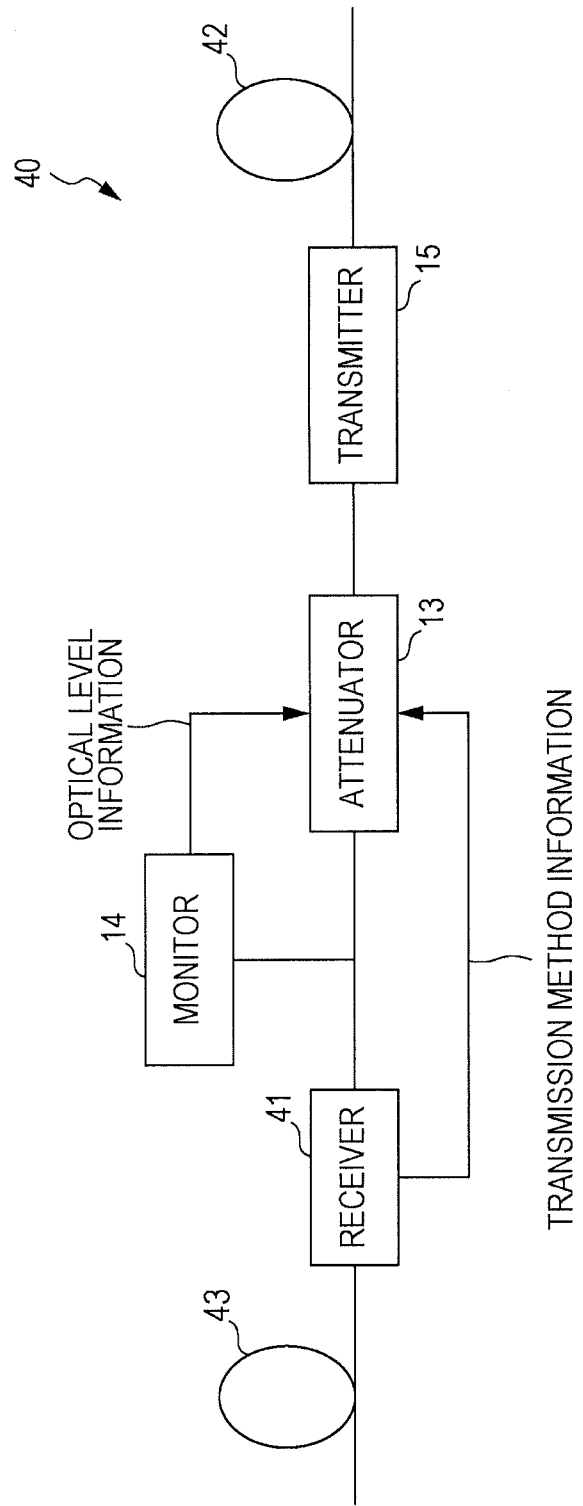
FIG. 10 illustrates the structure of an optical transmission apparatus in a fourth embodiment.

FIG. 10 illustrates the structure of an optical transmission apparatus in a fourth embodiment of the present disclosure. An optical transmission apparatus 40 in the fourth embodiment includes the attenuator 13, the monitor 14, the transmitter 15, and a receiver 41. The structures and operations of the attenuator 13, monitor 14, and transmitter 15 in the fourth embodiment are almost the same as in the first embodiment. In the fourth embodiment, however, the monitor 14 monitors the power of each optical signal included in the WDM signal output from the receiver 41. The WDM signal output from the transmitter 15 is transmitted to a next node through an optical fiber transmission path 42.

The receiver 41 receives a WDM signal through an optical fiber transmission path 43. The WDM signal is sent from the optical transmission apparatus included in an adjacent node. The receiver 41 then amplifies the received WDM signal with a predetermined gain. That is, all optical signals in the received WDM signal are amplified with the same gain. The receiver 41 is implemented with the same structure as, for example, the structure of the transmitter in FIG. 4.

In the fourth embodiment, the transmission method information, which represents a transmission method for each optical signal in a WDM signal, is transmitted by, for example, using a supervisory channel (SVC), which is a control channel set in the WDM signal. The control channel has been assigned a pre-specified wavelength. In this case, the receiver 41 has a function that separates the control channel from a received WDM signal and extracts the transmission method information from the control channel. The receiver 41 gives the transmission method information extracted from the received WDM signal to the attenuator 13. However, a notification of the transmission method information may be sent to the optical transmission apparatus 40 in another method. For example, the network management system 4 may notify each optical transmission apparatus 40 of the transmission method information.

The attenuator 13 controls the power of each optical signal in a WDM signal according to the transmission method information given from the receiver 41 (or the network management system 4) and optical level information generated by the monitor 14. In this control, the controller 24 in the attenuator 13 controls the variable attenuators 22-1 to 22-n so that the power of each optical signal output from the attenuator 13 approaches its target level. If it is assumed that the power of the optical signal λ1 in the WDM signal amplified by the receiver 41 is, for example, −17.5 dBm, then since the target value of the transmission power of the optical signal λ1 is −20 dBm as illustrated in FIG. 6, the controller 24 controls the amount of attenuation in the variable attenuator 22-1 to 2.5 dB. If it is assumed that the power of the optical signal λ3 in the WDM signal amplified by the receiver 41 is −15.6 dBm, then since the target value of the transmission power of the optical signal λ3 is −18 dBm as illustrated in FIG. 6, the controller 24 controls the amount of attenuation in the variable attenuator 22-3 to 2.4 dB.

A notification of the transmission method information about each optical signal in the WDM signal sent from the transmitter 15 is transmitted to a next node. The control channel set in the WDM signal, for example, is used to transmit the transmission method information. In this case, the transmitter 15 sets the transmission method information in the control channel.

Fifth Embodiment

Figure 11:
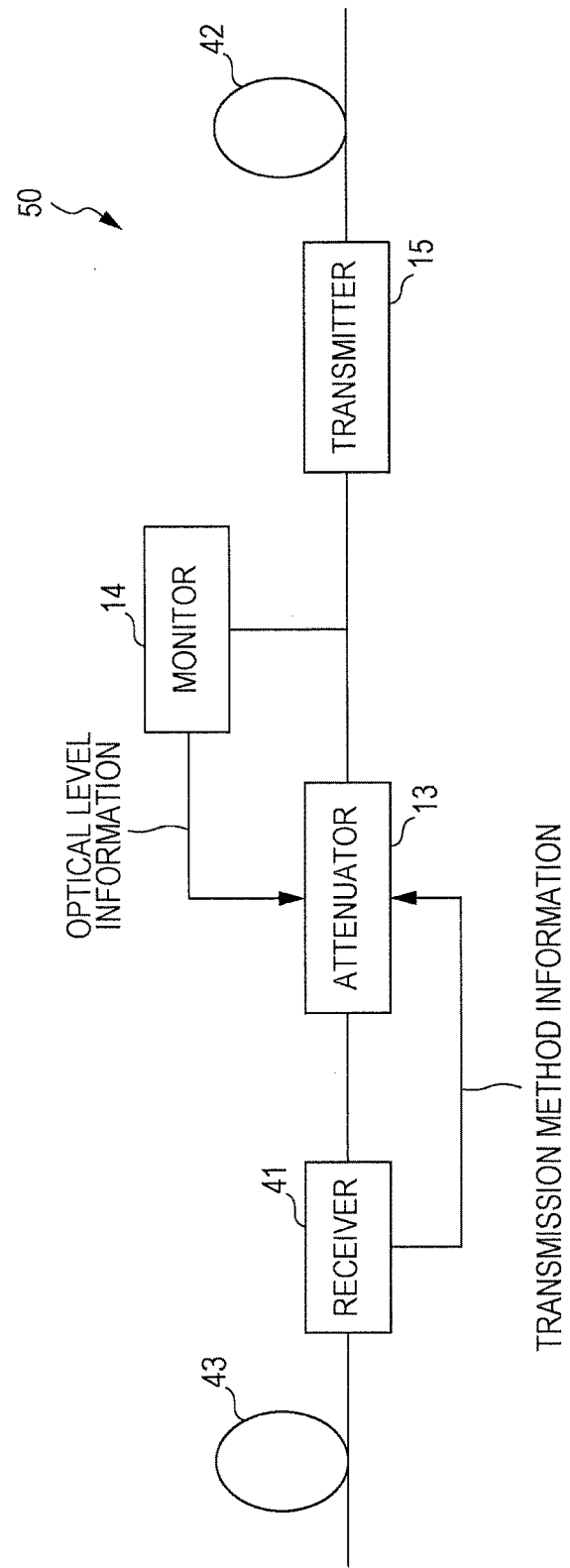
FIG. 11 illustrates the structure of an optical transmission apparatus in a fifth embodiment.

FIG. 11 illustrates the structure of an optical transmission apparatus 50 in a fifth embodiment of the present disclosure. In the fifth embodiment, the transmission method information is extracted from the received WDM signal by the receiver 41 and is given to the attenuator 13. This structure is the same as in the fourth embodiment. The monitor 14 monitors the power of each optical signal in the WDM signal output from the attenuator 13 and generates optical level information. This structure is the same as in the first embodiment. Therefore, attenuation control in the attenuator 13 in the fifth embodiment is essentially the same as in the first embodiment.

Sixth Embodiment

Figure 12:
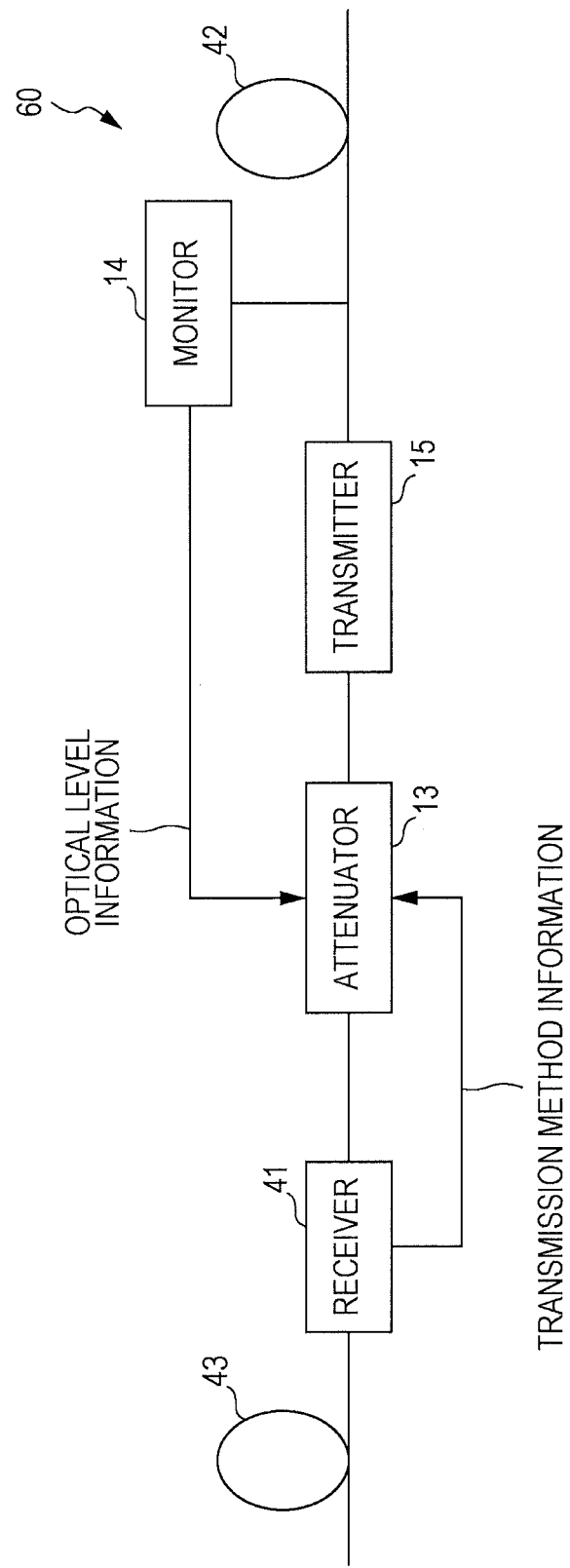
FIG. 12 illustrates the structure of an optical transmission apparatus in a sixth embodiment.

FIG. 12 illustrates the structure of an optical transmission apparatus 60 in a sixth embodiment of the present disclosure. In the sixth embodiment, the transmission method information is extracted from the received WDM signal by the receiver 41 and is given to the attenuator 13. This structure is the same as in the fourth embodiment. The monitor 14 monitors the power of each optical signal in the WDM signal output from the transmitter 15 and generates optical level information. This structure is the same as in the second embodiment. Therefore, attenuation control in the attenuator 13 in the sixth embodiment is essentially the same as in the second embodiment.

Seventh Embodiment

Figure 13:
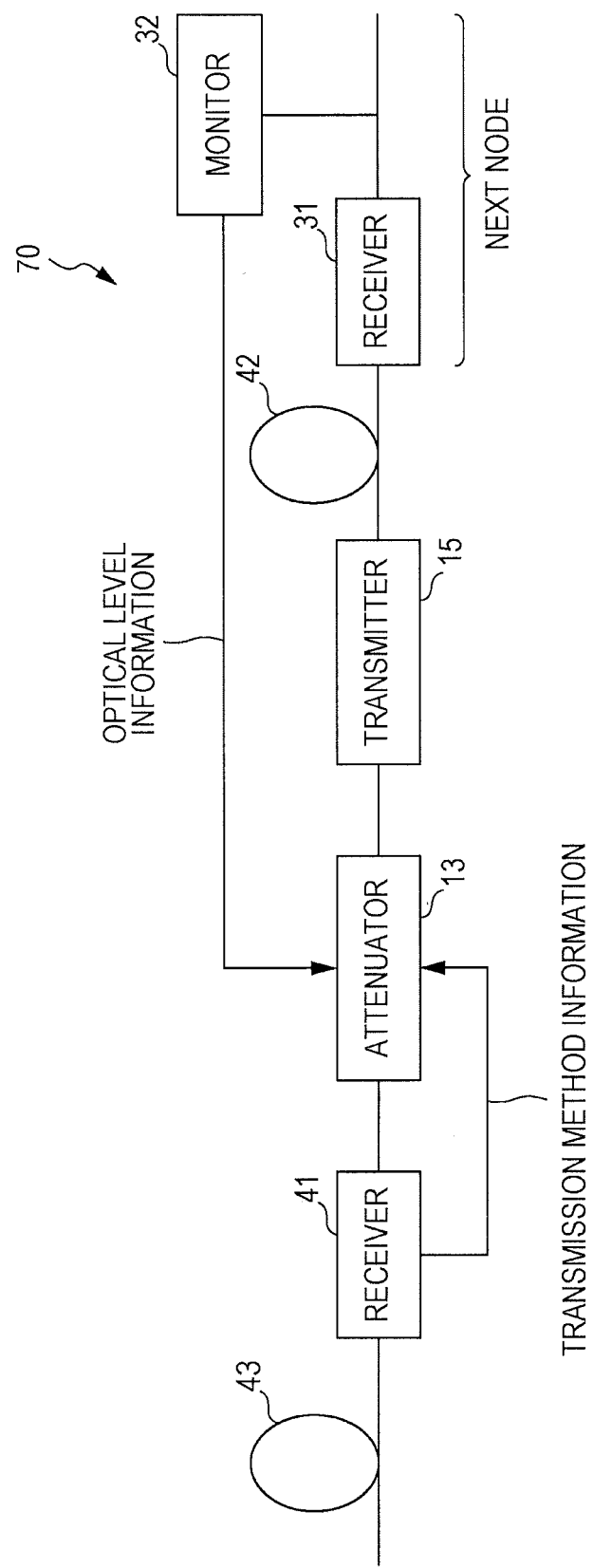
FIG. 13 illustrates the structure of an optical transmission apparatus in a seventh embodiment.

FIG. 13 illustrates the structure of an optical transmission apparatus 70 in a seventh embodiment of the present disclosure. In the seventh embodiment, the transmission method information is extracted from the received WDM signal by the receiver 41 and is given to the attenuator 13. This structure is the same as in the fourth embodiment. A notification of optical level information is sent from a next node. This structure is the same as in the third embodiment. Therefore, attenuation control in the attenuator 13 in the seventh embodiment is essentially the same as in the third embodiment.

Another Embodiment

The optical transmission apparatuses in the first to seventh embodiments described above can be implemented with, for example, a ROADM. The ROADM enables an optical signal in a specified wavelength channel to be branched from a received WDM signal and to be led to a client. The ROADM also enables an optical signal generated by the client to be inserted into a WDM signal. When there is a plurality of paths, the ROADM also enables a WDM signal including a specified wavelength channel to be output to a specified path. These functions are implemented by using a wavelength selective switch (WSS). The attenuator 13 in the above embodiments in the present disclosure may be implemented with a wavelength selective switch.

Figure 14:
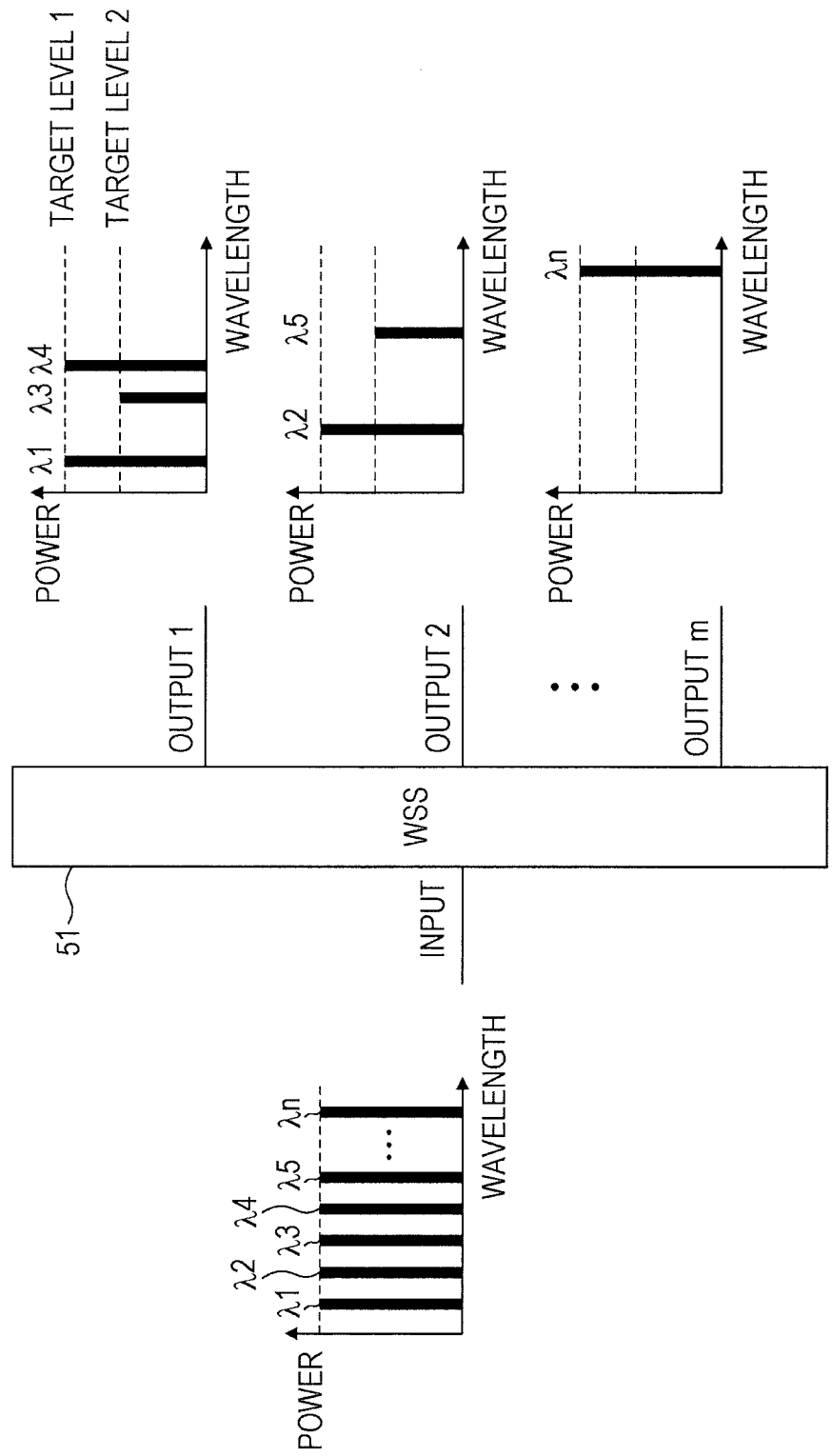
FIG. 14 illustrates an example of the operation of a wavelength selective switch.

FIG. 14 illustrates an example of the operation of a wavelength selective switch that has the functions of the attenuator 13. In this example, a WDM signal in which the optical signals λ1 to λn have been multiplexed is input to a wavelength selective switch 51. The optical signals λ1, λ2, λ4, and λn are each a 16QAM modulated optical signal. The optical signals λ3 and λ5 are each a QPSK modulated optical signal. The optical signals λ3, and λ4, are output to a path 1, the optical signals λ2 and λ5 are output to a path 2, and the optical signal λn is output to a path m.

The wavelength selective switch 51 includes the demultiplexer 21, the plurality of variable attenuators 22-1 to 22-n, and the controller 24 illustrated in FIG. 5. The wavelength selective switch 51 also includes an optical cross connector that leads optical signals output from the variable attenuators 22-1 to 22-n to specified paths. The wavelength selective switch 51 controls the power of the optical signals λ1 to λn according to the transmission method information described above. Specifically, the wavelength selective switch 51 controls the transmission power of the optical signals λ1, λ2, λ4, and λn to a target level 1 (−18 dBm, for example) specified for 16QAM. The wavelength selective switch 51 also controls the transmission power of the optical signals λ3 and λ5 to a target level 2 (−20 dBm, for example) specified for QPSK.

Although, in the above embodiments, the transmission power of an optical signal has been controlled according to the modulation method for the optical signal, another element may be considered. For example, an optical transmission apparatus may control the transmission power of an optical signal according to not only its corresponding modulation method but also the bit rate of the optical signal. In this case, the transmission power of an optical signal at a high bit rate may be increased and the transmission power of an optical signal at a low bit rate may be decreased. In an example, the QPSK modulation method may be used for both optical signals x and y, but the bit rates of the optical signals x and y may be respectively 100 Gbps and 50 Gbps. In this case, the optical transmission apparatus may control the transmission power of these optical signals so that the transmission power of the optical signal x becomes higher than the transmission power of the optical signal y.

The optical amplifier that amplifies a WDM signal may be provided only at one of the input side and output side of the attenuator 13 or at both sides.

The optical transmission apparatuses in the first to third embodiments control the power of optical signals generated by the optical transmitters 11 included in the optical transmission apparatuses in these embodiments. By contrast, the optical transmission apparatuses in the fourth to seventh embodiment control the power of optical signals in a received WDM signal. However, any combination of the first to third embodiments and the fourth to seventh embodiments may be used. If, for example, the first embodiment illustrated in FIG. 2 and the fifth embodiment illustrated in FIG. 11 are combined, optical signals generated by the optical transmitters 11 included in the optical transmission apparatus 10 and a received WDM signal are input to the attenuator 13. That is, the attenuator 13 can control the power of optical signals generated by the optical transmitters 11 included in the optical transmission apparatus 10 and the power of a received WDM signal. This structure may be implemented with, for example, the wavelength selective switch in FIG. 14.

EFFECTS

The optical transmission apparatuses in the above embodiments of the present disclosure control the transmission power of each optical signal in a WDM signal according to the modulation method for the optical signal, as described above. Effects obtained from this structure will be described below by comparing the structure with a structure by which the transmission power of all optical signals in a WDM signal is uniformly equalized.

FIG. 15A illustrates a state in which, at each node, the transmission power of all optical signals in a WDM signal is equalized in QPSK. That is, a QPSK modulated optical signal A and a 16QAM modulated optical signal B are transmitted at −15 dBm from each node. In this case, the OSNR of the 16QAM modulated optical signal B may fall below a threshold (OSNR withstand strength in 16QAM) at the receiver 3b included in a node C.

FIG. 15B illustrates a state in which, at each node, the transmission power of all optical signals in a WDM signal is equalized in 16QAM. That is, the QPSK modulated optical signal A and 16QAM modulated optical signal B are transmitted at −13 dBm from each node. In this case, the nonlinear penalty for the QPSK modulated optical signal A becomes large at the receiver 3a included in a node F.

Figure 16:
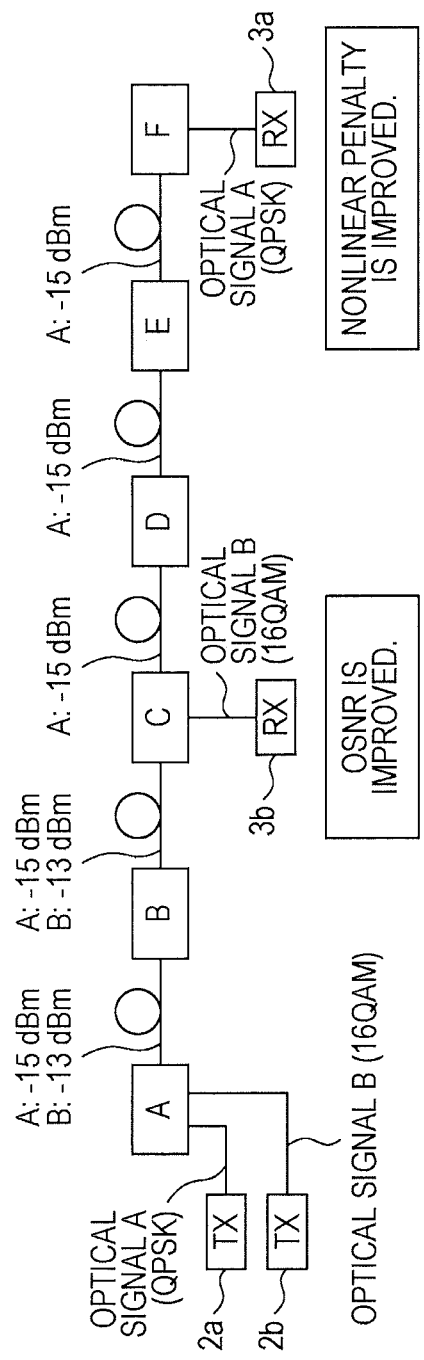
FIG. 16 illustrates an example of transmission in a structure in which optical signal power is controlled for each modulation method.

FIG. 16 illustrates an example of transmission in a structure in which optical signal power is controlled for each modulation method. In this example, at each node, the QPSK modulated optical signal A is transmitted at −15 dBm and the 16QAM modulated optical signal B is transmitted at −13 dBm. Then, when compared with the state in FIG. 15A, the OSNR of the 16QAM modulated optical signal B is improved at the receiver 3b included in the node C. When compared with the state in FIG. 15B, the nonlinear penalty for the QPSK modulated optical signal A is improved at the receiver 3a included in the node F. That is, the nonlinear penalty for an optical signal with a low modulation level is suppressed, improving the quality of an optical signal that is highly likely to be transmitted through a path with a long transmission distance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
a receiver that receives a wavelength division multiplexing (WDM) signal including a first optical signal generated in a first modulation method and a second optical signal generated in a second modulation method, a modulation level in the second modulation method being lower than a modulation level in the first modulation method; and
a transmitter that sends a WDM signal including the first optical signal and the second optical signal, wherein a power of the first optical signal is attenuated to a first target level associated with the first modulation method and a power of the second optical signal is attenuated to a second target level that is associated with the second modulation method, the second target level being lower than the first target level.

2. The optical transmission apparatus according to claim 1, wherein the transmitter includes an optical amplifier that amplifies the WDM signal including the first optical signal and the second optical signal that have been attenuated by an attenuator, the transmitter sending the WDM signal amplified by the optical amplifier.

3. The optical transmission apparatus according to claim 2, further comprising a monitor that monitors the power of the first optical signal and the power of the second optical signal, wherein
the attenuator controls an amount by which to attenuate the first optical signal and an amount by which to attenuate the second optical signal, according to a result of monitoring by the monitor.

4. The optical transmission apparatus according to claim 3, wherein the monitor monitors the power of the first optical signal and the power of the second optical signal that are output from the attenuator.

5. The optical transmission apparatus according to claim 4, wherein the attenuator controls the amount by which to attenuate the first optical signal so that the monitored power of the first optical signal approaches the first target level, and controls the amount by which to attenuate the second optical signal so that the monitored power of the second optical signal approaches the second target level.

6. The optical transmission apparatus according to claim 3, wherein the monitor monitors the power of the first optical signal and the power of the second optical signal that are output from the transmitter.

7. The optical transmission apparatus according to claim 3, wherein the monitor monitors the power of the first optical signal and the power of the second optical signal that are output from the receiver.

8. The optical transmission apparatus according to claim 2, wherein the attenuator attenuates an amount by which to attenuate the first optical signal and an amount by which to attenuate the second optical signal, according to optical level information that represents the power of the first optical signal and the power of the second optical signal, the attenuator being notified of the optical level information by an optical transmission apparatus that receives the WDM signal sent from the transmitter.

9. The optical transmission apparatus according to claim 1, wherein:
the receiver extracts transmission method information that represents a modulation method for each optical signal in the WDM signal that the receiver receives, and gives the extracted transmission method information to an attenuator; and
the attenuator identifies a modulation method for the first optical signal and a modulation method for the second optical signal, according to the transmission method information.

10. The optical transmission apparatus according to claim 1, wherein the transmitter sends a next node transmission method information that represents a modulation method for each optical signal in the WDM signal that the transmitter sends.

11. The optical transmission apparatus according to claim 1, wherein a transmission distance from a sending end of the first optical signal to a receiving end of the first optical signal is shorter than a transmission distance from a sending end of the second optical signal to a receiving end of the second optical signal.

12. An optical transmission apparatus comprising:
an attenuator that attenuates a power of a first optical signal generated in a first modulation method to a first target level associated with the first modulation method and attenuates a power of a second optical signal generated in a second modulation method to a second target level associated with the second modulation method, a modulation level in the second modulation method being lower than the modulation level in the first modulation method, to a second target level, the second target level being lower than the first target level; and
a transmitter that sends a wavelength division multiplexing (WDM) signal including the first optical signal and the second optical signal that have been attenuated by the attenuator.

13. An optical transmission system that includes a plurality of optical transmission apparatuses, each of which transmits a wavelength division multiplexing (WDM) signal, wherein:
each optical transmission apparatus includes
a receiver that receives a WDM signal,
an attenuator that attenuates an optical signal included in the WDM signal received by the receiver according to a modulation method for the optical signal, and
a transmitter that sends a WDM signal including the optical signal that has been attenuated by the attenuator; and
the attenuator attenuates a power of a first optical signal generated in a first modulation method to a first target level associated with the first modulation method, the first optical signal being included in the WDM signal received by the receiver, and when a second optical signal generated in a second modulation method is included in the WDM signal received by the receiver, attenuates a power of the second optical signal to a second target level associated with the second modulation method, a modulation level in the second modulation method being lower than the modulation level in the first modulation method, to a second target level, the second target level being lower than the first target level.

14. The optical transmission system according to claim 13, wherein a transmission distance from a sending end of the first optical signal to a receiving end of the first optical signal is shorter than a transmission distance from a sending end of the second optical signal to a receiving end of the second optical signal.

* * * * *